United States Patent
Klaghofer et al.

(10) Patent No.: US 7,903,636 B2
(45) Date of Patent: Mar. 8, 2011

(54) METHOD FOR CONTROLLING POWER CHARACTERISTICS IN PACKET-ORIENTED COMMUNICATION NETWORKS

(75) Inventors: Karl Klaghofer, München (DE); Harald Müller, Gilching (DE); Heribert Müller, Eggenburg (AT); Jürgen Totzke, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 965 days.

(21) Appl. No.: 10/490,524

(22) PCT Filed: Sep. 16, 2002

(86) PCT No.: PCT/DE02/03457
§ 371 (c)(1),
(2), (4) Date: Mar. 23, 2004

(87) PCT Pub. No.: WO03/028349
PCT Pub. Date: Apr. 3, 2003

(65) Prior Publication Data
US 2004/0240452 A1    Dec. 2, 2004

(30) Foreign Application Priority Data
Sep. 25, 2001 (DE) .................. 101 47 151

(51) Int. Cl.
*H04L 12/66* (2006.01)
*H04L 12/28* (2006.01)

(52) U.S. Cl. ........................... 370/352; 370/401
(58) Field of Classification Search .......... 370/352, 370/395.21, 401
See application file for complete search history.

(56) References Cited

U.S. PATENT DOCUMENTS

| | | | |
|---|---|---|---|
| 6,591,301 B1* | 7/2003 | Li et al. | 709/229 |
| 6,775,253 B1* | 8/2004 | Agrawal et al. | 370/329 |
| 6,795,444 B1* | 9/2004 | Vo et al. | 370/401 |
| 6,961,332 B1* | 11/2005 | Li et al. | 370/352 |
| 7,002,970 B1* | 2/2006 | Veschi | 370/401 |
| 7,016,343 B1* | 3/2006 | Mermel et al. | 370/356 |
| 7,542,424 B2* | 6/2009 | Hierholzer et al. | 370/236 |
| 2002/0103895 A1* | 8/2002 | Chiang | 709/224 |
| 2002/0159440 A1* | 10/2002 | Mussman et al. | 370/352 |
| 2003/0163572 A1* | 8/2003 | Hierholzer et al. | 709/227 |

FOREIGN PATENT DOCUMENTS

| | | |
|---|---|---|
| CA | 2249821 | 4/1999 |
| WO | WO 99/29081 | 6/1999 |
| WO | WO 00/13369 A2 | 3/2000 |
| WO | WO 01/67661 A2 | 9/2001 |

OTHER PUBLICATIONS

GSM & UMTS, Digital Cellular Telecommunications System (Phase 2+) (GSM); Universal Mobile Telecommunications System (UMTS); Technical Report on Pre-Paging (3G TR 23.908 Version 3.0.0 Release 1999), ETSI TR 123 908 V3.0.0 (2000-01), pp. 1-17.

* cited by examiner

Primary Examiner — Pankaj Kumar
Assistant Examiner — Marcus R Smith

(57) ABSTRACT

According to the invention, a power characteristic information concerning a power characteristic profile of a target terminal is transmitted to a base terminal, before transferring signaling of a connection set up from a base terminal to a target terminal. As a result of the connection set up signaling, a power characteristic request is transferred based on the power characteristic information.

21 Claims, 2 Drawing Sheets

A gateway coupled to originating and destination terminating device receives a destination terminating device feature profile before a connection setup signal. The call features supported by the destination terminating device is not an address of the destination terminating device and is not an address of the originating terminating device. The call features supported by the destination terminating device is not a phone number of the destination terminating device and is not a phone number of the originating terminating device.

↓

The gateway receives the connection setup signal from the originating terminating device. The connection setup signal comprises a feature request.

↓

The gateway modifies the feature request to exclude a call feature not within the call features of the feature profile of the destination terminating device.

↓

The gateway sends the connection setup signal with the modified feature request to the destination terminating device.

FIGURE 2

METHOD FOR CONTROLLING POWER CHARACTERISTICS IN PACKET-ORIENTED COMMUNICATION NETWORKS

CROSS REFERENCE TO RELATED APPLICATIONS

This application is the US National Stage of International Application No. PCT/DE02/03457, filed Sep. 16, 2002 and claims the benefit thereof The International Application claims the benefits of German application No. 10147151.3 DE filed Sep. 25, 2001, both of the applications are incorporated by reference herein in their entirety.

FIELD OF INVENTION

Increasingly in modern communication systems, realtime connections for voice, video, or multimedia communication, for example, are also being routed over packet-oriented communication networks such as, for instance, local area networks (LAN: Local Area Network) or wide area networks (WAN: Wide Area Network). What is termed internet telephony, frequently also referred to as VoIP (VoIP: Voice/Video-over-Internet Protocol) telephony, is an example of communication based on this technology.

BACKGROUND OF INVENTION

Modern packet-oriented communication systems, in particular those conforming to ITU-T recommendation H.323, make a large number of features available which are familiar from conventional, circuit-switched communication technology such as, for example; call forwarding, call offering, call override, and call waiting. Since connections to terminating devices of very different types are possible in packet-oriented communication systems of this kind, the problem may arise that a particular terminating device requests a feature which a connection partner of said terminating device is unable to provide. In this case the feature request will have a fruitless outcome, which in packet-oriented communication networks in particular will not be recognized until a relatively long period of time has particular will not be recognized until a relatively long period of time has elapsed. Such timeout effects, as they are called, result in disagreeable delays for the person using the terminating device. This problem has proved to be especially acute in the case of connections between packet-oriented communication systems which are mutually independent in terms of their configuration and administration.

SUMMARY OF INVENTION

The object of the present invention is to disclose a method for controlling features in packet-oriented communication systems enabling such delays to be avoided.

Said object is achieved by means of a method having the features of claim 1.

With the method according to the invention, feature information relating to a feature profile of the destination terminating device is transmitted in the direction of the originating terminating device before a connection setup signal is sent, with said signal being transmitted from an originating terminating device to a destination terminating device. A feature request is then transmitted with the connection setup signal as a function of the transmitted feature information.

The feature request can thus be adjusted to the feature profile of the destination terminating device. The requesting of a feature not supported by the destination terminating device with the connection setup signal can in this way be avoided. A futile feature request of that kind would result in a termination of the connection setup, or would at least delay it considerably.

Advantageous embodiments and developments of the invention are disclosed in the dependent claims.

According to an advantageous embodiment of the invention, transmission of the feature information can be prompted by a specific inquiry signal. The originating terminating device can, for instance, transmit a specific inquiry signal to the destination terminating device or to a connection control responsible for said destination terminating device before the connection setup signal is sent in order to interrogate the feature information. Alternatively, the feature information can also be transmitted without an inquiry or it can be exchanged between a domain of the originating terminating device and a domain of the destination terminating device.

Transmission of the feature information can furthermore also be prompted by means of a signal which is actually intended for other purposes. The advantage of this is that a specific inquiry signal does not have to be defined in the communication system.

According to a particularly advantageous embodiment of the invention, the feature information can be transmitted as part of an address resolving procedure. The feature information can in particular be transmitted as an additional information element within an address information signal. The advantage of combining the transmission of the feature information in this way with an address resolving procedure taking place before the actual connection setup is that it is not necessary to transmit any additional signal sequences. The actual connection setup will consequently not be additionally delayed by the transmission of the feature information.

According to a further advantageous embodiment of the invention, the feature information is transmitted as far as the originating terminating device, where the feature request subsequently being transmitted will be generated or modified as a function of the received feature information. The feature request can preferably be modified interactively with a user of the originating terminating device. For example, a feature request for the call override feature can be changed following receipt of the feature information into a feature request for the call waiting feature if the feature information indicates that the destination terminating device does not support the call override feature.

It is furthermore possible to embody a user interface of the originating terminating device as a function of the received feature information after said feature information has been transmitted to the originating terminating device. It is possible, for example, for the user interface of the originating terminating device only to offer the features which, according to the received feature information, are supported by the destination terminating device.

According to an advantageous development of the invention, the feature information is stored in a network interworking facility. The feature request being transmitted subsequently will then be forwarded and/or converted by the network interworking facility as a function of the stored feature information. This is highly advantageous particularly when the originating terminating device and the destination terminating device belong to different communication systems coupled by the network interworking facility. Based on the stored feature information, the network interworking facility can convert, terminate and/or acknowledge the feature request being transmitted subsequently depending on the feature profile of the destination terminating device or, as the case may be, of the communication network containing said device.

According to an advantageous embodiment of the invention, the connection setup signal can be transmitted via a communication system conforming to ITU-T recommendation H.323 or to the SIP (Session Initiation Protocol) standard of the IETF Forum.

BRIEF DESCRIPTION OF THE DRAWING

An exemplary embodiment of the invention is explained in more detail below with reference to the drawings.

FIG. 2 is a flow chart illustrating a present preferred method for controlling call features in a packet oriented communication system.

DETAILED DESCRIPTION OF INVENTION

Figure 1:
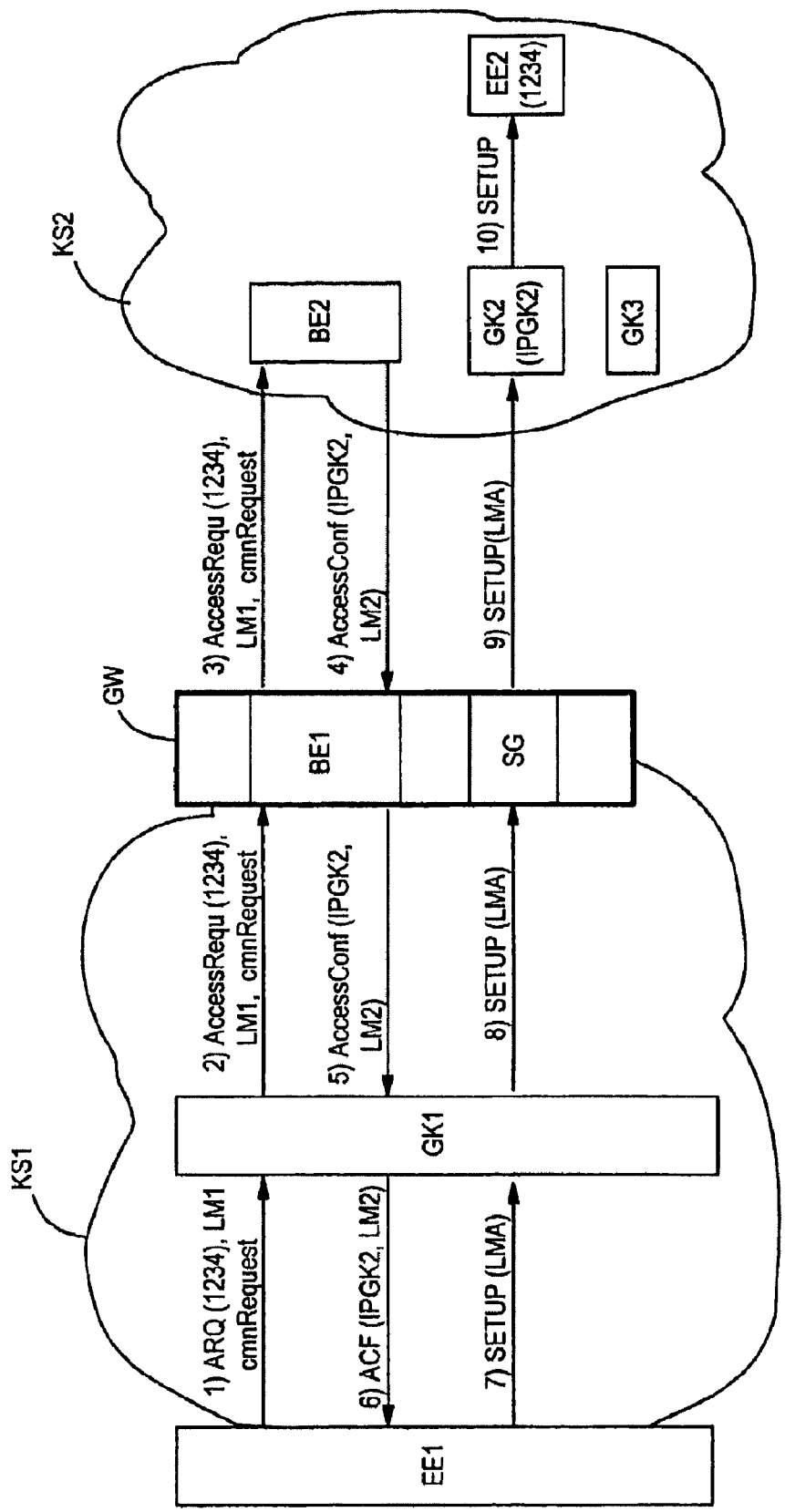
FIG. 1 is a schematic of two coupled packet-oriented communication systems.

FIG. 1 is a schematic of two packet-oriented communication systems KS1 and KS2 coupled via a network interworking facility embodied as a gateway GW. Communication systems KS1 and KS2 are embodied as internet-protocol-based VoIP (Voice/Video-over-Internet Protocol) systems for realtime communication connections for voice, video and/or multimedia communication. Said communication systems KS1 and KS2 are assumed in the present exemplary embodiment to have been implemented in conformity with ITU-T recommendation H.323. At least one of the communication systems KS1 and KS2 could alternatively conform to the SIP standard of the IETF Forum. Communication system KS1 can typically be a private enterprise network and communication system KS2 a carrier network or another external enterprise network. A present preferred method that may be utilized in the system shown in FIG. 1 may be appreciated from FIG. 2.

Apart from the gateway GW, communication system KS1 also has what is termed a gatekeeper GK1 serving as a connection control according to recommendation H.323 and a terminating device EE1. Communication system KS2 for its part has two gatekeepers GK2 and GK3 according to recommendation H.323 and a terminating device EE2 to which a telephone number 1234 is assigned as a terminating device address. Gatekeepers GK1, GK2, and GK3 serve in the main to control and administer realtime communication connections and to perform access controlling and address resolving. Gatekeeper GK1 is here responsible for connections to the terminating device EE1, and gatekeeper GK2 is here responsible for connections to the terminating device EE2. Gatekeeper GK2 is further assigned an IP address (IP: Internet Protocol) IPGK2 as a network address.

Terminating devices EE1 and EE2 can be embodied as, for example, conventional communication terminals or as personal computers, application programs, or client applications.

As functional components, gateway GW has what is termed a signaling gateway SG for signaling across different communication systems and an address resolving facility BE1 for address resolving across different communication systems. Address resolving facility BE1 is embodied in the present exemplary embodiment as what is termed a border element according to ITU-T recommendation H.225.0 Annex G.

A further address resolving facility BE2 for address resolving across different communication systems is contained in communication system KS2.

Prior to an actual connection setup to a destination terminating device identified by means of a dialed destination address, address resolving has to be carried out in VoIP systems in order to derive from the destination address a network address on the basis of which communication data packets can be transported within the communication network. Said destination address can be, for example, a telephone number or what is termed a URI (Universal Resource Identifier). Address resolving of this type can be implemented for connections between different, what are termed, gatekeeper zones (Inter Zone), for connections between different administrative domains (Inter Domain), or for connections between different VoIP systems conforming, for example, to ITU-T recommendation H.225.0 Annex G.

A connection setup from terminating device EE1 of communication system KS1 to terminating device EE2 of communication system KS2 is considered in the following as part of the exemplary embodiment. The connection setup consists of ten call phases 1-10.

The connection setup is initiated by a subscriber at terminating device EE1 by keying in telephone number 1234 of destination terminating device EE2. In call phase 1, terminating device EE1 consequently transmits an admission request signal ARQ (Admission Request) according to ITU-T recommendations H.323 and H.225.0 to gatekeeper GK1. The admission request signal ARQ contains destination number 1234 which is to be resolved by gatekeeper GK1 into a network address. In the present exemplary embodiment, gatekeeper GK1 is unable to resolve destination number 1234, however, as the called terminating device EE2 is not located within gatekeeper GK1's area of responsibility. In call phase 2, gatekeeper GK1 therefore transmits an address resolving request AccessRequ (Access Request) in accordance, for example, with Annex G of recommendation H.225.0, together with destination number 1234 to address resolving facility BE1, which is able to exchange the address information with the other VoIP system KS2.

If address resolving facility BE1 has not already stored a network address via which the terminating device EE2 can be accessed and which is assigned to destination number 1234, then in call phase 3 address resolving facility BE1 will transmit the address resolving request AccessRequ, together with the destination number 1234, in accordance, for example, with Annex G of recommendation H.225.0, to address resolving facility BE2 of communication system KS2.

With the signals transmitted in call phases 1, 2, and 3 it is optionally possible to transmit feature information LM1 specifying a feature profile of features available to terminating device EE1. With the signals transmitted in call phases 1, 2, and 3 it is furthermore possible to transmit an inquiry signal cmnReguest (Common Information Request), in accordance, for example, with ITU-T recommendation H.450.12, in order to prompt communication system KS2 to transmit feature information LM2 into communication system KS1. Feature information LM2 here specifies a feature profile of features available to called terminating device EE2.

According to a variant method, provision can be made for communication system KS2 to be prompted to transmit feature information LM2 not by means of a specific inquiry signal but, instead, by means of the address resolving request itself.

In the present exemplary embodiment, address resolving facility BE2 is able to resolve destination number 1234 transmitted to it because terminating device EE2 identified thereby belongs to said address resolving facility BE2's area of responsibility. Destination number 1234 is resolved by address resolving facility BE2 into IP address IPGK2 of gatekeeper GK2 as the network address via which terminating device EE2 can be accessed. In call phase 4, address resolving facility BE2 therefore transmits IP address IPGK2 in an address information signal AccessConf (Access Confirmation), in accordance, for example, with Annex G of recommendation H.225.0, to address resolving facility BE1.

According to the invention, address information signal AccessConf here contains feature information LM2 as an additional information element. Address information signal AccessConf is forwarded in call phase 5 by address resolving facility BE1 to gatekeeper GK1. In call phase 6, said gatekeeper GK1 thereupon transmits IP address IPGK2 and feature information LM2 in a confirmation of admission signal ACF (Admission Confirm), for example according to recommendation H.225.0, to calling terminating device EE1.

Network address IPGK2 via which called terminating device EE2 can be accessed is known after phase 6 in terminating device EE1, in gatekeeper GK1, and in gateway GW. This means a connection setup signal SETUP, for example according to recommendation H.225.0, can be transmitted in call phases 7, 8, and 9 on a specifically targeted basis from terminating device EE1 via gatekeeper GK1 and signaling gateway SG to gatekeeper GK2.

From received feature information LM2 it is additionally known in terminating device EE1 which features are available to terminating device EE2. This can be taken into consideration in the case of a feature request LMA transmitted to gatekeeper GK2 with connection setup signal SETUP in call phases 7, 8, and 9. For example, a feature which is not supported by destination terminating device EE2 (or, where applicable, by a device serving as a proxy for said terminating device EE2) can be prevented from being included in feature request LMA. A feature request which has already been generated can be modified accordingly. As an instance of this, a call override feature originally requested by the user of terminating device EE1, for example according to ITU-T recommendation H.450.11, can already be rejected locally in terminating device EE1, with the user instead being offered the use of a feature with a similar function which is supported by destination terminating device EE2 such as, for example, call waiting. A feature not supported by destination terminating device EE2 can optionally be changed independently by calling terminating device EE1 into a feature with a similar function which is supported by destination terminating device EE2.

When feature request LMA generated or modified as a function of feature information LM2 has been transmitted to gatekeeper GK2, the connection setup signal SETUP is forwarded by said gatekeeper to called terminating device EE2 in call phase 10. The features requested with feature request LMA are hereby activated for terminating device EE2.

According to a variant of the method according to the invention, feature information LM2 transmitted to address resolving facility BE1 in call phase 4 is stored in address resolving facility BE1. Forwarding of feature information LM2 to gatekeeper GK1 or, as the case may be, to terminating device EE1 in call phases 5 and 6 can optionally be suppressed here. Feature request LMA transmitted in call phase 8 with the connection setup signal SETUP to gateway GW can then be forwarded, converted and/or terminated by gateway GW as a function of stored feature information LM2. If, for example, the reverse charging feature is requested with feature request LMA transmitted in call phase 8, gateway GW or, as the case may be, signaling gateway SG can terminate the connection setup attempt if stored feature information LM2 indicates that the reverse charging feature is unavailable to terminating device EE2.

Owing to the transmission of feature information LM2 and, where applicable, of feature information LM1 as part of an in any event necessary address resolving procedure which includes call phases 1 to 6, no additional signal sequences are required for carrying out the method according to the invention. The connection setup will consequently not be additionally delayed. By transmitting the feature profile of called terminating device EE2 in advance, it is furthermore possible to avoid any further delays due to the requesting of non-supported features.

The exemplary embodiment described above can readily be generalized to the effect that communication systems KS1 and KS2 are treated as being different administrative domains or different gatekeeper zones, as they are termed, within a single VoIP system. Communication systems KS1 and KS2 can furthermore also have different connection control protocols, KS1 having an H.323 protocol and KS2 having an SIP protocol, for example.

The invention claimed is:

1. A method for controlling call features in a packet-oriented communication system having an originating terminating device and a destination terminating device each capable of providing certain call features, the method comprising:
   receiving a destination terminating device feature profile by said originating terminating device before a connection setup signal, the destination terminating device feature profile comprising call features supported by the destination terminating device, the call features supported by the destination terminating device not being an address of the destination terminating device and not being an address of the originating terminating device, the call features supported by the destination terminating device not being a phone number of the destination terminating device and not being a phone number of the originating terminating device; and
   at said originating terminating device:
   sending the connection setup signal to the destination terminating device, the connection setup signal comprising a feature request to be used to establish a connection between the originating and destination terminating devices,
   wherein the feature request is based on the received destination terminating device feature profile such that the feature request includes a call feature supported by the destination terminating device.

2. The method of claim 1 wherein the receiving said destination terminating device feature profile is in response to an inquiry signal transmitted by said originating terminating device.

3. The method of claim 1 wherein the receiving said destination terminating device feature profile is in response to a multi-purpose signal transmitted by said originating terminating device.

4. The method of claim 1 wherein the receiving said destination terminating device feature profile is in response to a signal related to an address resolution process performed by said originating terminating device.

5. The method of claim 1 wherein said destination terminating device feature profile is transmitted within an address information signal.

6. The method of claim 1 wherein said destination terminating device feature profile is received from an address resolving facility.

7. The method of claim 6 wherein the address resolving facility is in a different network than said originating terminating device.

8. The method of claim 1 wherein an address resolution process is initiated via a user of said originating terminating device by the user initiating a call to said destination terminating device.

9. The method of claim 1 further comprises said originating terminating device prompting a user for the feature request based on the received destination terminating device feature profile.

10. The method of claim 1 wherein the call features supported by the destination terminating device is comprised of at least one of call forwarding, call offering, call override and call waiting.

11. A method for controlling call features in a packet-oriented communication system having an originating terminating device and a destination terminating device each capable of providing certain call features, the method comprising: at a gateway communicatively coupled to said originating and destination terminating devices: receiving a destination terminating device feature profile before a connection setup signal, the destination terminating device feature profile comprising call features supported by the destination terminating device, the call features supported by the destination terminating device not being an address of the destination terminating device and not being an address of the originating terminating device, the call features supported by the destination terminating device not being a phone number of the destination terminating device and not being a phone number of the originating terminating device; receiving the connection setup signal from said originating terminating device, the connection setup signal comprising a feature request; modifying the feature request to exclude a call feature not within the call features of the feature profile of the destination terminating device; and sending the connection setup signal with the modified feature request to the destination terminating device.

12. The method of claim 11 wherein the receiving said destination terminating device feature profile is in response to an inquiry signal transmitted by said originating terminating device.

13. The method of claim 11 wherein the step of receiving said destination terminating device feature profile is in response to a multi-purpose signal transmitted by said originating terminating device.

14. The method of claim 11 wherein the step of receiving said destination terminating device feature profile is in response to a signal related to an address resolution process performed by said originating terminating device.

15. The method of claim 11 wherein said destination terminating device feature profile is transmitted within an address information signal.

16. The method of claim 11 further comprising storing the said destination terminating device feature profile by said gateway.

17. The method of claim 11 wherein said destination terminating device feature profile is received from an address resolving facility.

18. The method of claim 17 wherein the address resolving facility is in a different network than said originating terminating device.

19. The method of claim 11 wherein said address resolution process is initiated via a user of said originating terminating device by the user initiating a call to said destination terminating device.

20. The method of claim 11 wherein the received destination terminating device feature profile is suppressed by the gateway and not sent to the originating terminating device.

21. The method of claim 11 wherein the call features supported by the destination terminating device is comprised of at least one of call forwarding, call offering, call override and call waiting.

* * * * *